United States Patent Office 3,334,949
Patented Aug. 8, 1967

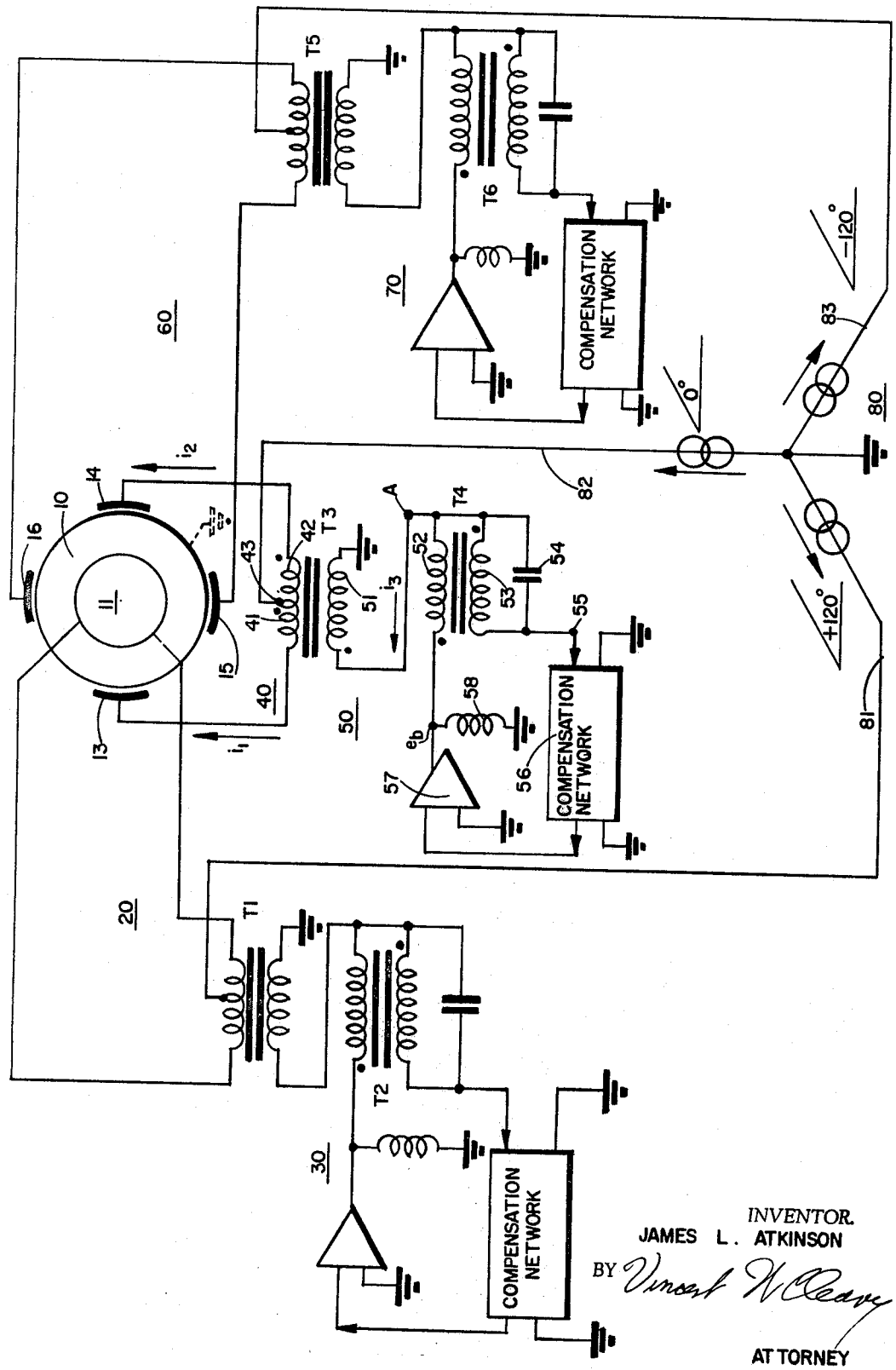

3,334,949
ELECTROSTATIC BEARING
James L. Atkinson, La Mirada, Calif., assignor to North American Aviation, Inc.
Filed Mar. 29, 1965, Ser. No. 443,539
5 Claims. (Cl. 308—10)

ABSTRACT OF THE DISCLOSURE

A circuit for electrostatically supporting a rotatable member between a pair of electrodes in which the rotatable member is supported by an A.C. potential between it and the electrodes. A sensing circuit is inductively coupled to the supporting circuit to derive a signal which varies as a function of the position of the rotatable member. The position signal is applied to an amplifier having first and second input terminals, the output from which is then applied to a transformer which is connected to divide the amplified position signal between the inductive coupling and the first and second inputs to the amplifier.

---

This invention relates to an electrostatic type bearing and particularly to an electrostatic bearing adaptable to electrostatically rotatably support a rotor of a gyroscope.

In U.S. patent application, Ser. No. 442,135, entitled, Gyroscope, filed Mar. 23, 1965, in the name of William H. Quick, and assigned to North American Aviation, Inc., the assignee of the present application, there is described an electrostatic bearing for a gyroscope rotor which utilizes the sensing support current as the sensing current without having a feedback problem in the servo amplifier. When the rotor of the gyroscope is vibrated or forced back and forth the alternating supporting current is modulated so that the resultant rotor effects or operates as a balanced modulator so as to produce a double side band suppressed carrier output. A feature of the present invention is to utilize a model transformer to effect cancellation of feedback in the servo amplifier. By so utilizing the model transformer, the relatively wide frequency range of the above amplitude modulated double side band suppressed carrier signal can be cancelled. As a result, the servo is stable throughout this relatively wide range of frequencies.

Another object of the invention is the provision of a circuit for supporting the rotor of an electrostatic gyro which utilizes the minimum of stages yet will not oscillate.

A still further object of the invention is to provide a control circuit for electrostatically supporting the rotor of a free rotor gyroscope which is stable and does not require additional oscillators for sensing the position of the rotor while being electrostatically supported.

These and other objects of the invention will become more apparent from a reading of the specification taken in conjunction with the drawing which illustrates an electrostatic supporting circuit embodying the invention.

The drawing illustrates a three axis support for an electrostatic gyro having a conductive spherical rotor 10 which is electrostatically rotatably supported by electrode plates 15 and 16 in the Z axis, electrodes 13 and 14 in the Y axis, and electrodes 11 and 12 (not shown) in the X axis. In the embodiment shown in the drawing, the above respective pairs of plates are shown symbolically as circular and concentric with the respective axes. It will be understood that various shapes of these plates can be employed. In addition, their intersurfaces will preferably be concave and concentric with the center of spherical rotor 10. Plates 11 through 16 have intersurfaces which define a sphere, i.e., slightly larger than and concentric with sphere 10.

Plates or electrodes 11 and 12 are connected to a power supporting circuit 20 for supporting sphere 10 in the X axis. A sensing and servo circuit 30 is coupled by a transformer T1 to power supporting circuit 20 so as to effect centering of sphere 10 between electrodes 11 and 12. That is, if sphere 10 tends to not be centered between electrodes 11 and 12, sensing and centering circuit 30 will effect application of an alternating current signal through power circuit 20 to electrodes 11 and 12 so as to center sphere 10 therebetween when sphere 10 tends to move off center.

Electrodes 13 and 14 are connected to a power supporting circuit 40 for supporting sphere 10 between electrodes 13 and 14. A sensing and servo circuit 50 is coupled by a transformer T3 to power supporting circuit 40 so as to sense when sphere 10 is not centered between electrodes 13 and 14 and in response thereto will apply an additive signal to power circuit 40 to effect centering of sphere 10 between electrodes 13 and 14. Electrodes 15 and 16 are connected to a power supporting circuit 60 so as to electrostatically suspend and support sphere 10 midway between electrodes 15 and 16. A sensing and servo circuit 70 is coupled through a transformer T5 to power circuit 60 so as to effect centering of sphere 10 between electrodes 15 and 16 at all times.

Sphere 10 is an electroconductive sphere made of some material such as aluminum. In the preferred form shown in the drawing, a three-phase constant current power supply 80 through conductors 81, 82 and 83 provides power in three phases as indicated in the drawing, to electrostatically suspend sphere 10 through circuits 20, 40 and 60. More specifically, conductor 81 is connected to provide a constant current to the center tap secondary of transformer T1 of circuit 20. Conductor 82 provides a constant current which is 120 degees out of phase with those on conductor 81 and conductor 83 and is connected to the center tap secondary of transformer T3 of power circuit 40. This applies an alternating current voltage between electrodes 13 and 14 and sphere 10. Conductor 83 is connected to the center tap secondary of transformer T5 of power circuit 60 so as to effect a constant current which is 120 degrees out of phase with the current on conductors 82 and 81. Thus, by this connection between three-phase power supply 80 and power circuits 20, 40 and 60, sufficient voltage is effected between electrodes 11–16 and conductive sphere 10 so as to normally (without external force) electrostatically rotatably support sphere 10 along three axes. As utilized as a gyroscope, many suitable ways can be employed to commence rotation of rotor 10 so as to operate the rotor as a gyroscope rotor. As is well known, an electrostatically supported gyroscope rotor will "coast" a considerable length of time in a vacuum after rotary power movement has been applied to the rotor, i.e., it is only necessary to apply a force to the rotor of an electrostatically supported gyroscope approximately once every year for the rotor to operate as a gyroscope. Means for rotating the gyroscope rotor are well known in the art and form no part of the present invention.

Power circuit 40 and sensing and servo circuit 50 which are utilized to electrostatically support and center conductive sphere 10 between electrodes 13 and 14 in the Y axis are numbered in detail in the drawing. Since power circuit 20 with sensing and servo circuit 30 as well as power circuit 60 with sensing and servo circuit 70 are identical to power supporting circuit 40 with sensing and servo circuit 50 only power supporting circuit 40 and sensing and servo circuit 50 will be described in detail.

As shown in the drawing, the secondary of transformer T3 is center tapped at 43 so as to divide this winding into two equal windings 41 and 42. These windings are poled as shown by the dots in the drawing and have their outer ends electrically connected to concave electrodes 13 and 14. Due to the A.C. currents applied through conductors 81, 82 and 83, to their respective electrodes, conductive sphere 10 will be maintained at A.C. ground. Thus, a current from conductor 82 will flow through coils 41 and 42, electrodes 13 and 14, respectively, and thence through conductive sphere 10 back to ground. When sphere 10 is centered or equidistant from electrodes 13 and 14, the two branch currents $i_1$ and $i_2$ in the drawing passing through winding 41 and winding 42, respectively, will be equal. When these currents are equal and sphere 10 is centered in the Y axis, there will be no voltage induced back into the primary 51 of transformer T3.

Sensing and servo circuits 50 includes the primary 51 of transformer T3 having one end grounded as shown and the other end as shown in the embodiment on the drawing defining a point of reference potential A. A model transformer T4 has one end of its secondary 53 connected to this point of reference potential A; connected across the secondary 53 is a capacitor 54. An amplifier is shown having a first input terminal 55 connected to the other end of secondary 53 of transformer T4 with a second input terminal as ground. The amplifier includes a standard servo compensation network 56 as well as an amplifying element 57. Compensation network 56 could include, for example, a notch filter at the frequency of power supply 80 as well as a band pass filter both of which are known in the art. The frequency of power supply 80, by way of example, could be 5,000 c.p.s. Amplifying element 57 provides no phase shift to the signal. For stability, network 56 normally provides a lead of 30 degrees to 50 degrees to the side bands about 1,000 centigrades from the carrier. No phase shift is effected to the carrier in element 57 or in the servo loop. Connected across the output of amplifying element 57 is a power factor correction inductor 58 which is parallel resonant with the two series connected transformer reflected capacitors at the frequency of the power supply. The first of said capacitors is capacitor 54 reflected to primary 52 of transformer T4. The second of said capacitors is the capacitor formed by electrodes 13 and 14 separated by conductive sphere 11 reflected to primary 51 of transformer T3.

Model transformer T4 as well as the windings of transformer T3 have their windings poled as shown by the dots in the drawing.

When sphere 10 is vibrated or forced by some external force, it will operate as a balanced modulator providing a double side band suppressed carrier output signal. Thus, it will be understood that under such conditions, the amplified signals back through primary 51 and to input 55 of the amplifier will include many side band frequencies and consequently will have a relatively large frequency spectrum. For this reason, depending on the frequency of the signal so reflected back to the input of the amplifier, the system could become highly regenerative so as to be incapable of supporting sphere 10. In the present invention, it has ben found that by utilizing a model transformer, this relatively large frequency range of amplified side bands can be cancelled so as to prevent application of these amplified side bands back to the input of the amplifier.

More specifically, the current passing from the output of amplifying element 57 passing through primary winding 52, as well as primary winding 51 sees a certain impedance over this wide frequency range due to the reflected impedance or characteristics of secondary 53 as well as capacitor 54 so that input terminal 55 is held at ground with respect to the output of amplifying element 57. More specifically, as a result of the impedance of model transformer T4 over the relatively wide side band frequency range, the alternating current signal due to the output of amplifying element 57 developed between reference point A and input terminal 55 is equal to but opposite in polarity from the alternating current signal developed between reference point A across winding 51 and ground. As a result, cancellation of the amplified sensing signal is achieved so as to prevent regeneration when there is a difference in current between $i_1$ and $i_2$ caused by sphere 10 being off center or tending to be off center between electrodes 13 and 14.

More specifically in the steady state analysis (no motion of rotor) below:

$v_3$ = the voltage across winding 51
$v_4$ = the voltage across winding 53
$v_5$ = the voltage across winding 52.

also, $$\frac{N_1}{N_2}$$

= the turns ratio between windings 41 and 42 which equals 1.

For the specific example, $$\frac{N_3}{N_1}$$

= the turns ratio between winding 51 and winding 41

$$\frac{N_5}{N_4}$$

= the turns ratio between windings 52 and 53
$C_3$ = the capacitance of capacitor 54
$C_0$ = the capacitance between electrode 13 and sphere 10 and/or the capacitance between electrode 14 and sphere 10 when sphere 10 is centered between electrodes 13 and 14.
$i_0 = i_1 + i_2$
$i_3$ = the current passing through winding 52
$i_4$ = the current passing through winding 53
$e_p$ = the A.C. potential at reference point 55
$\epsilon_0$ = relative displacement of rotor 10 from its central position
$K$ = gain of amplifying element 57
$s$ = Laplace
$\omega_c$ = radian frequency of supply 80
$C(x)$ = capacitance between sphere 10 and an electrode as displaced a distance ($x$) from its centered position
$g_0$ = gap between electrodes and sphere when sphere is centered.

*Pickoff voltage, $e_p$, and cancellation capacitance, $C_3$(54)*

$$v_3 = \left(\frac{N_3}{N_1}\right)^2 \frac{i_3}{2C_0 s} + \frac{N_3}{N_1} \frac{i_0 \epsilon_0}{2C_0 s} \quad (1.1)$$

Now, $$v_4 = -\frac{i_4}{C_3 s} + \frac{N_5}{N_4} \frac{i_3}{C_3 s} \quad (1.2)$$

and, $$e_p = -v_4 + v_3 \quad (1.3)$$

Thus, $$e_p = -\frac{N_5}{N_4} \frac{i_3}{C_3 s} + \left(\frac{N_3}{N_1}\right)^2 \frac{i_3}{2C_0 s} + \frac{N_3}{N_1} \frac{i_0 \epsilon_0}{2C_0 s} \quad (1.4)$$

For perfect cancellation, it can be seen that:

$$C_3 = \frac{N_5}{N_4}\left(\frac{N_1}{N_3}\right)^2 2C_0 \quad (1.5)$$

So that $e_p$ will not vary as a function of $i_3$ $$e_p = \frac{N_3}{N_1} \frac{i_0 \epsilon_0}{2C_0 s} \quad (1.6)$$

*Control Current, $i_3$*

Looking both ways from $e_b$ in the drawing $$e_b = Ke_p \text{ and } e_b = v_5 + v_3 \quad (1.7)$$

$$v_5 = \frac{N_5}{N_4} v_4 = \left(\frac{N_5}{N_4}\right)^2 \frac{i_3}{C_3 s} = \frac{N_5}{N_4}\left(\frac{N_3}{N_1}\right)^2 \frac{i_3}{2C_0 s} \quad (1.8)$$

Thus, from Equation 1.7

$$K\frac{N_3}{N_1}\frac{i_o \epsilon_o}{2C_o s}=\frac{N_5}{N_4}\left(\frac{N_3}{N_1}\right)^2 \frac{i_3}{2C_o s}+\left(\frac{N_3}{N_1}\right)^2 \frac{i_3}{2C_o s}+\frac{N_3}{N_1}\frac{i_o \epsilon_o}{2C_o s} \quad (1.9)$$

or $$i_3=\frac{N_1}{N_3}\left(\frac{K-1}{1+\frac{N_5}{N_4}}\right)i_o \epsilon_o \quad (1.10)$$

*Current, $e_1$*

$$i_1=\frac{1}{2}\left(i_o-\frac{N_3}{N_1}i_3\right) \quad (1.11)$$

Thus, $$i_1=\frac{i_o}{2}\left(1-\frac{K-1}{1+\frac{N_5}{N_4}}\epsilon_o\right) \quad (1.12)$$

*Normalized Stiffness, A*

A is the coefficient of $\epsilon_o$ in the expression for top plate current.
Thus, $$A=\frac{K-1}{1+\frac{N_5}{N_4}} \quad (1.13)$$

For the purposes of measurement, A can be derived in terms of the plate voltages $e_{c1}$ and $e_{c2}$ of electrodes 13 and 14, respectively.

$$e_{c1}=\frac{i_1(1-\epsilon_o)}{C_o s}=\frac{i_o}{2C_o s}[1-\epsilon_o-A\epsilon_o(1-\epsilon_o)] \quad (1.14)$$

and $$e_{c2}=\frac{i_2(1+\epsilon_5)}{C_o s} \quad (1.15)$$

Rearranging and solving for A in Equation 1.14, $$A=\frac{1}{\epsilon_o}\left[A-\frac{e_{c1}}{\frac{i_o}{2C_o s}(1-\epsilon_o)}\right] \quad (1.16)$$

Similarly, $$A=\frac{1}{\epsilon_o}\left[\frac{e_{c2}}{\frac{i_o}{2C_o s}(1+\epsilon_o^2)}-1\right] \quad (1.17)$$

*Current source terminal voltage, $v_a$ at center tap 43*

It can be shown that $$v_a=\frac{i_o}{2C_o s}+\frac{N_3}{N_1}\frac{i_3 \epsilon_o}{2C_o}=\frac{i_o}{2C_o s}(1+A\epsilon_o^2) \quad (1.18)$$

*Power factor correction inductance, $L_b$ (inductor 58)*

The purpose of $L_b$ (coil 58) is described above. When $L_b$ is properly chosen, the amplifier delivers no current to the circuit in steady state conditions since resistive losses are not included in the model. Thus, the current $i_3$ must be coming up through $L_b$ from ground.
Then, $$L_b i_3 s = -e_b \quad (1.19)$$

It can be shown that $$-L_b i_3 s = \left[\frac{N_5}{N_4}\left(\frac{N_3}{N_1}\right)^2 + \frac{1}{A}\left(\frac{N_3}{N_1}\right)^2\right]\frac{i_3}{2C_o s} \quad (1.20)$$

For $s=j\omega_c$ $$L_b = \frac{1}{2C_o \omega_c^2}\left(\frac{N_3}{N_1}\right)^2\left[\frac{N_5}{N_4}+1+\frac{1}{A}\right] \quad (1.21)$$

*Electrostatic Force, F*

The force expression can be derived from the energy (W) stored in the electric field.

$$W=\frac{1}{2}\frac{i^2}{\omega_c^2}\frac{1}{C(x)} \quad (1.22)$$

$$F_1=\frac{\partial W}{\partial x}=\frac{1}{2}\frac{i_1^2}{\omega_c^2}\frac{\partial \frac{1}{C_o}\left(1-\frac{x}{g_o}\right)}{\partial x}=-\frac{1}{2}\frac{i_1^2}{\omega_c^2 g_o C_o} \quad (1.23)$$

(force pulling rotor to left)
and $$F_2=+\frac{1}{2}\frac{i_2^2}{\omega_c^2 g_o C_o} \quad (1.24)$$

The net force is the sum of the downward force $F_2$ and the upward force $F_1$, $$F=F_2+F_1=\frac{1}{2}\frac{1}{\omega_c^2 g_o C_o}(i_2^2-i_1^2) \quad (1.25)$$

Since, $F_n$, the normalized force is $$F_n=(i_2^2-i_1^2) \quad (1.26)$$

then, $$F=\frac{F_n}{2\omega_c^2 g_o C_o} \quad (1.27)$$

It can be shown $$F_n(s)=\frac{I_o^2}{2}A(s)\epsilon(s)=\frac{I_o^2}{2g_o}A(s)x(s) \quad (1.28)$$

where $I_o$ is the peak value of the carrier support current, $g_o$ is the nominal gap in meters, $x$ is the displacement in meters, and $A(s)$ contains the compensation network. Thus, $$F(s)=\frac{I_o^2}{4\omega_c^2 g_o^2 C_o}A(s)x(s) \text{ newtons} \quad (1.29)$$

This is the expression for the restoring electrostatic force on the rotor.
In Equation 1.13 replace K by $KN(s)$ (according to the drawing) and for simplicity drop the $-1$ term. Laboratory observations indicate that this is a permissible approximation when observing dynamic behavior.
Then, $$F(s)=\frac{KI_o^2}{\left(1+\frac{N_5}{N_4}\right)4\omega_c^2 g_o^2 C_o}N(s)x(s) \quad (1.30)$$

where $N(0)=1$. It is to be remembered that Equation 1.30 is valid only in this case where the transformers are ideal and cancellation can be perfect.

*Transformer impedance scaling*

The impedance, $Z_b$, looking into the control winding 51 of the transformer is, from Equations 1.1, 1.10 and 1.13.

$$Z_b=\frac{v_3}{i_3}=\left(\frac{N_3}{N_1}\right)^2\frac{1}{2C_o s}\text{ for } A\gg 1 \quad (1.31)$$

The impedance, $Z_m$, looking into winding 51 of the model transformer is, from Equation 1.8.

$$Z_m=\frac{v_5}{i_3}=\frac{N_5}{N_4}\left(\frac{N_3}{N_1}\right)^2\frac{1}{2C_o s} \quad (1.32)$$

Note that $Z_m/Z_b=N_5/N_4\doteq\frac{1}{4}$ in practice. Thus, the voltage drop across the model is only one-quarter of that across the balanced transformer and for a given gain, K, the stiffness, according to Equation 1.13, is higher than if a one-to-one scaling ($N_5=N_4$) were to be used. However, now the physical construction of the two transformers is not identical and problems in matching impedances over a wide frequency band are somewhat greater.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An electrostatic bearing support circuit for supporting a rotatable member between a pair of electrodes, comprising, in combination, electrostatic support means for establishing an A.C. potential between said rotatable member and said electrodes for electrostatically supporting said rotatable member, sensing means for providing an A.C. position signal which varies as a function of the position of said rotatable member with respect to said electrodes, first inductance means inductively coupling said sensing means to said support means, said sensing means comprising an amplifier for amplifying said position signal, said amplifier having first and second input terminals and an output terminal, said first inductance means being operatively coupled to said second input terminal, and second inductance means operatively coupled via a common terminal to said first inductance means and operatively coupled to said first input terminal and said output terminal to provide a first predetermined portion of the amplified position signal between said common terminal and said first input terminal, and to provide a second predetermined portion of said amplified position signal between said common terminal and said second input terminal, said first and said second predetermined portions being substantially equal but opposite in polarity.

2. An electrostatic bearing support circuit for supporting a rotatable member between a pair of electrodes, comprising, in combination, electrostatic support means for establishing an A.C. potential between said rotatable member and said electrodes for electrostatically supporting said rotatable member, sensing means for providing an A.C. position signal which varies as a function of the position of said rotatable member with respect to said electrodes, inductance means inductively coupling said sensing means to said support means, said sensing means comprising an amplifier for amplifying said position signal, said amplifier having first and second input terminals and an output terminal, said inductance means being operatively coupled to said second input terminal, and transformer means having a primary and a secondary, said primary being operatively coupled to said output terminal and via a common terminal to said inductance means, said secondary being operatively coupled to said first input terminal and via said common terminal to said inductance means so as to provide a first predetermined portion of the amplified position signal between said common terminal and said first input terminal and to provide a second predetermined portion of said amplified position signal between said common terminal and said second input terminal, said first and said second predetermined portions being substantially equal but opposite in polarity.

3. A free rotor gyro comprising, in combination, a rotor, first and second electrodes, electrostatic support means for establishing an A.C. potential between said rotor and said electrodes to electrostatically support said rotor, sensing means for providing an A.C. position signal which varies as a function of the position of said rotor with respect to said electrodes, first transformer means having a primary and a second inductively coupling said sensing means to said support means, said sensing means comprising an amplifier for amplifying said position signal, said amplifier having first and second input terminals and an output terminal, and second transformer means having a primary and a secondary, the primary of said second transformer means and the primary of said first transformer means being operatively coupled in series between said output terminal and said second input terminal, the secondary of said second transformer means being operatively coupled between said first input terminal and the common connection between the primaries of said first and second transformer means so that the alternating current potentials of the amplified position signal across the primary of said first transformer means and the secondary of said second transformer means are equal but opposite in polarity.

4. A free rotor gyro comprising, in combination, a rotor, first and second electrodes adjacent said rotor and arranged coaxially on opposite sides thereof, an electrostatic support circuit for establishing an alternating current potential between said rotor and said electrodes for electrostatically supporting said rotor along a predetermined axis, sensing means for providing an alternating current position signal which varies as a function of the difference in current flow between said electrodes and said rotor, a first transformer having primary and secondary windings for coupling said sensing means to said support circuit, said sensing means comprising an amplifier for amplifying said position signal, said amplifier having first and second input terminals and an output terminal, and a second transformer having primary and secondary windings, the primary windings of said first and said second transformers being operatively coupled in series between said output terminal and said second input terminal, the secondary winding of said second transformer being operatively coupled between said first input terminal and the common connection between the primary windings of said first and said second transformers, the voltages across the primary winding of said first transformer and the secondary winding of said second transformer being substantially equal but opposite in polarity.

5. A free rotor gyro comprising, in combination, a rotor, first and second electrodes, a power circuit for establishing an A.C. charge between said rotor and said electrodes to electrostatically support said rotor, a sensing circuit for providing an alternating current position signal which varies as a function of the difference in current through said electrodes, first transformer means having a primary winding in said sensing circuit and a secondary winding in said power circuit for inductively coupling said sensing circuit to said power circuit, said secondary winding being operatively coupled to said electrodes, said sensing circuit further comprising amplifier means for amplifying said position signal, said amplifier means having first and second input terminals and an output terminal, second transformer means having primary and secondary windings, the primary windings of said first and said second transformer means being operatively coupled in series between said output terminal and said second input terminal, the secondary winding of said second transformer means having one end thereof operatively coupled to said first input terminal and the other end thereof operatively coupled to the common connection between the primary windings of said first and said second transformer means, and capacitance means operatively coupled across the secondary winding of said second transformer means so that the voltages effected across the secondary winding of said second transformer means and the primary winding of said first transformer means are substantially equal but opposite in polarity.

No references cited.

MILTON O. HIRSHFIELD, *Primary Examiner.*

L. L. SMITH, *Assistant Examiner.*